(12) United States Patent
Mih et al.

(10) Patent No.: US 8,439,235 B2
(45) Date of Patent: *May 14, 2013

(54) AUTOMATIC GROUND-COFFEE DISPENSER

(75) Inventors: Séverine Mih, Mayenne (FR); Thierry Dutertre, Saint Germain du Corbeis (FR)

(73) Assignee: SEB S.A., Ecully (FR)

( * ) Notice: Subject to any disclaimer, the term of this patent is extended or adjusted under 35 U.S.C. 154(b) by 174 days.

This patent is subject to a terminal disclaimer.

(21) Appl. No.: 12/992,732

(22) PCT Filed: May 12, 2009

(86) PCT No.: PCT/FR2009/000548
§ 371 (c)(1),
(2), (4) Date: Feb. 7, 2011

(87) PCT Pub. No.: WO2009/141537
PCT Pub. Date: Nov. 26, 2009

(65) Prior Publication Data
US 2011/0163131 A1 Jul. 7, 2011

(30) Foreign Application Priority Data

May 16, 2008 (FR) ..................... 08 02654

(51) Int. Cl.
*G01F 11/20* (2006.01)

(52) U.S. Cl.
USPC ............... 222/410; 99/289 R; 99/286; 99/287

(58) Field of Classification Search ..... 222/410; 99/286, 99/287, 289 R
See application file for complete search history.

(56) References Cited

U.S. PATENT DOCUMENTS

| | | | |
|---|---|---|---|
| 2,894,662 A | 7/1959 | Mansperger | |
| 5,791,526 A * | 8/1998 | Landais et al. | 222/185.1 |
| 8,042,455 B2 * | 10/2011 | Lebuffe et al. | 99/289 R |
| 8,161,867 B2 * | 4/2012 | Dutertre et al. | 99/289 R |

FOREIGN PATENT DOCUMENTS

| | | |
|---|---|---|
| DE | 19714303 C1 | 9/1998 |
| FR | 2713906 A1 | 6/1995 |

* cited by examiner

*Primary Examiner* — Kevin P Shaver
*Assistant Examiner* — Michael Melaragno
(74) *Attorney, Agent, or Firm* — The Webb Law Firm (57) ABSTRACT

An automatic ground-coffee dispenser with a ground-coffee storage vessel designed to be mounted on an automatic coffee maker. The storage vessel includes rotary serving paddles for transferring a predetermined quantity of ground coffee through an outflow opening formed in the bottom of the storage vessel and a cone-shaped driver with rotary paddles located above the outflow opening turned by a motor about a vertical axis of the storage vessel. The internal wall of the storage vessel includes at least one longitudinal rib projecting into the storage vessel.

17 Claims, 4 Drawing Sheets

Fig.1

SECTION A-A
Fig.2b

AUTOMATIC GROUND-COFFEE DISPENSER

BACKGROUND OF THE INVENTION

1. Field of the Invention

The present invention relates to an automatic ground coffee dispenser designed to be mounted on an automatic coffee maker.

2. Description of Related Art

Such an automatic ground coffee dispenser is disclosed in French patent # 2713906 and comprises a storage vessel containing ground coffee and means for transferring a serving of ground coffee to the brewing chamber of an automatic coffee maker via an outflow opening located in the bottom portion of the storage vessel. The means for transferring the ground coffee consist of a plurality of rotary serving paddles located in the bottom of the storage vessel and borne by a cylindrical element driven in rotation about the axis of the storage vessel by a motor group. Four other upper radial paddles are borne by a coupling element with a conical outer shape, are arranged immediately above the serving paddles in order to convey the ground coffee to the bottom of the storage vessel, and are driven in rotation by the same means as the first paddles. Because the storage vessel is removably installed in the machine, provision is made of coupling means between the motor group and the cylindrical paddle drive element. Although operation is satisfactory, it was noted that certain types of ground coffee had a natural tendency to agglomerate and form bridges or lumps inside the storage vessel, which are sometimes carried along in rotation by the paddles and as a result the ground coffee is no longer able to descend to the serving paddles. If the brewing chamber is no longer correctly supplied [with ground coffee], this poses significant operational problems, particularly in the scope of an automatic coffee maker.

A solution was described in German patent # 19714303, wherein the ground coffee serving device comprises two sets of rotary paddles and means for driving them in opposite directions. Hence a truncated conical bottom section bears a first set of paddles and upwardly extends to form a conical tip bearing a second set of paddles. The serving device has first means for driving the bottom section in rotation and, between the latter and the mixer, second means for reversing the direction of the first rotary movement and for transferring it to the tip part. According to the document, these means are pinions or pulleys. Although a better conveying of the ground coffee to the bottom of the storage vessel is achieved, the complicated construction of this device poses a major disadvantage by making the arrangement of the transmission mechanisms in a space limited by the dimensions of the conical piece difficult. Furthermore, the mechanism may jam if ground coffee particles penetrate the gap separating the two mobile parts, namely the mixer and the lower section.

SUMMARY OF THE INVENTION

The object of the present invention is to remedy the aforementioned disadvantages and to propose an automatic ground coffee dispenser suitable for dispensing, at a constant rate over time, a precise amount of ground coffee regardless of the filling level of ground coffee in the storage vessel.

Another object of the invention is an automatic ground coffee dispenser that is easy to manipulate and clean.

Another object of the invention is an automatic ground coffee dispenser that is reliable in operation, has a simplified construction, and is economically manufacturable.

These objects are achieved with an automatic coffee ground coffee dispenser having a ground coffee storage vessel comprising rotary serving paddles for transferring a predetermined amount of ground coffee through an outflow opening formed in the bottom of the storage vessel, and a cone-shaped driver with rotary paddles disposed above the outflow opening and brought into rotation about a vertical axis of the storage vessel by motor means, the internal wall of the storage vessel having at least one longitudinal rib projecting into the storage vessel.

The automatic ground coffee dispenser of the invention has, in the bottom of its storage vessel containing the ground coffee, serving means arranged below a cone-shaped driver comprising rotary radial paddles displaced by motorized drive means. The paddles of the cone-shaped driver operate in the bottom of the storage vessel, but above the outflow opening in order to push the ground coffee to the adjacent serving means. The paddles of the serving means as well as the paddles for conveying the ground coffee are advantageously actuated by a common drive source, notably by linking the cone-shaped driver to a hub with serving paddles brought into rotation in the bottom of the storage vessel.

According to the invention, the internal wall of the storage vessel comprises at least one longitudinal rib projecting into the storage vessel. Such a protruding rib forms an obstacle to the ground coffee conveyed by the paddles, forcing the particles to turn individually while they are being conveyed by the drive paddles. In fact the ground coffee particles, especially in the case of very fine ones, tend to agglutinate and form bridges or lumps that rotate about the axis of the storage vessel while being carried along by the rotary paddles of the cone-shaped driver. As a consequence of being carried along in rotation, these lumps strike the internal ribs of the storage vessel configured as additional thickenings in the internal walls thereof, and are thus cracked or broken by these ribs. This causes the ground coffee particles to deagglomerate and fall to the bottom of the storage vessel, where they are dispensed through the outflow opening of the dispenser by the serving paddles.

This enables the achievement of a uniform flow and a precise serving of ground coffee from the dispenser.

Preference is given to the width of the longitudinal rib covering a circular segment with an angle less than or equal to the angle between two adjacent rotary paddles.

Because the bridges or lumps of ground coffee form between two adjacent paddles, effective fragmentation of each ground coffee lump is thus obtained. Furthermore, two adjacent paddles are thus prevented from simultaneously coming into contact with the rib or ribs (one paddle leaves the segment covered by the rib before or as the next paddle approaches the rib), thus avoiding the imposition of excessive resistance to rotation and possibly overloading the drive motor of the dispenser.

The internal wall of the storage vessel of the dispenser advantageously comprises three ribs uniformly distributed on a circular segment with an angle less than or equal to the angle between two adjacent rotary paddles.

This enables an even finer fragmentation of the ground coffee lump and the achievement of an even more freely flowing and uniform mixture. By coming into successive contact with the approaching ribs, with each contact the ground coffee lump is subjected to a force causing it to break up, the finer lumps then being broken by the following ribs.

Preference is given to the rib being a circular ring segment with a thickness in the range of between 0.1 and 0.5 mm, preferably equal to 0.2 mm.

The rib thus configured therefore has a uniform thickness, which facilitates the cleaning of the storage vessel. During laboratory tests it was observed that a thickness in the range of between 0.1 and 0.5 mm, preferably 0.2 mm, permits effective breaking of the ground coffee lumps in rotation without impinging on the clearance existing between the outer diameter of the rotary drive paddles and the inner diameter of the ribs. In fact this clearance must be greater than the maximum diameter of the ground coffee particles in order to prevent the paddles from jamming, but sufficiently small so as to break up the agglutinated particles when they come into contact with the rib.

The longitudinal rib advantageously extends appreciably along the effective height of the storage vessel.

Effective height of the storage vessel is understood to mean the distance from the bottom to the maximum filling level of the storage vessel. A rib thus extending along this height permits effective operation regardless of the filling level of the storage vessel.

Preference is given to the cone-shaped driver extending to the top portion of the storage vessel in the form of a pyramid-shaped mixer. This mixer, connected to the cone-shaped driver and turning with the latter, thus makes it possible to mix the ground coffee in the top part of the storage vessel in addition to the mixing achieved in the bottom part of the storage vessel by the paddles of the cone-shaped driver. By virtue of this rotation, the pyramid-shaped mixer permits the ground coffee to descend to the cone-shaped driver and from there to the serving means to be dispensed via the outflow opening with less effort on the part of the dispenser motor.

Pyramid-shaped mixer is understood to mean a part located on the top end of the cone-shaped driver that can have the shape of a pyramid or a pyramid trunk, with the top oriented upwards. After numerous studies performed in the laboratory with different shapes of mixtures, it was observed that such a shape enabled the creation of a vortex of a length comparable to that of the height of the pyramid-shaped mixer, thus conveying the ground coffee to the bottom of the storage vessel. Such a mixer arranged above the cone-shaped driver thus prevents the formation of bridges in the ground coffee contained in the top part of the storage vessel and ensures a good flow of the ground coffee, and also of ground coffee with very fine granulometry such as that used for making espresso.

Preference is given to both the cone-shaped driver and the mixer forming a monobloc mixer assembly extending to the maximum filling level of the storage vessel.

Such a monobloc assembly enables the achievement of a homogeneous mixing of the entire mass of ground coffee contained in the storage vessel, even when the latter is full.

The storage vessel advantageously has a circular cross-section and the mixer advantageously has a square cross-section.

Although other cross-sectional shapes (triangular, rectangular, oval, hexagonal, etc.) are possible, nevertheless it has been observed in laboratory experiments that a square cross-section uniformly conveys all of the coffee particles to the bottom of the storage vessel. Satisfactory results have thus been achieved with a storage vessel having a diameter of 100 mm and a tip having a square cross-section with sides ranging from 10 mm at the top and 25 mm at the base without reducing the capacity of the storage vessel in any way.

Preference is given to the pyramid-shaped mixer having a height equal to at least half the height of the mixer assembly.

Phenomena of conveying the mixture to the bottom of the storage vessel start to appear when the mixer and the cone-shaped driver have comparable lengths. In a variant, such a pyramid-shaped piece can extend the entire length of the drive assembly.

The pyramid-shaped mixer advantageously comprises two radially extending long fins arranged in proximity to its bottom end.

The length of the two fins is slightly less than the inner diameter of the storage vessel in order to achieve, as the fins rotate, a better mixing of the ground coffee in the top portion of the storage vessel as well as to break any peripheral bridges that could form with very finely ground high-fat coffee, which naturally has a strong tendency to agglomerate. Additionally, by using only two fins, moreover fins advantageously configured as very thin rods, the resistance torque inside the storage vessel can be reduced and the mixing power of the device improved. Furthermore, the number of long fins was limited for practical reasons, namely to provide more space for reaching into the storage vessel when cleaning it, for example.

Said long fins are advantageously angularly offset relative to the paddles of the cone-shaped driver.

This ensures a better mixing throughout the entire volume of the storage vessel. For improved efficacy, a long fin is positioned midway between two rotary paddles of the cone-shaped driver located below.

Preference is given to the pyramid-shaped mixer having two radially extending short fins arranged in proximity to its top end.

These short fins form a means for grasping the mixer assembly (in a manner similar to the fins on a wing nut) and by which the user applies the rotation torque when he or she turns the assembly manually in order to clean the bottom of the storage vessel. By turning the mixer assembly, the rotating serving paddles sweep the bottom of the storage vessel and expel the ground coffee residue through the outflow opening.

The long fins are advantageously arranged in a vertical plane passing through a diagonal of the cross-section of the mixer and the short fins are advantageously arranged in a vertical plane perpendicular to the first plane.

As the mixer is advantageously manufactured from plastic by an injection technique, this construction with transversal fins makes it easier to remove the pieces from the mold after injection.

Preference is given to the pyramid-shaped mixer having an apex with a flat top surface bearing an indicator of the filling level of the storage vessel.

This is a simple and reliable aid for filling the storage vessel, as such an indicator on the top surface is readily visible to an observer looking at it, regardless of the quality of the lighting or the color of the storage vessel.

The storage vessel is advantageously removably installed in a receptacle of the dispenser and has means for coupling in rotation with the corresponding means of the motor means of the dispenser.

This makes it possible to remove the ground coffee storage vessel in order to replace it with another storage vessel containing another type of grounds, or to clean it.

The objects of the invention are also achieved with an automatic coffee maker having a dispenser of the invention.

BRIEF DESCRIPTION OF THE DRAWINGS

The invention will be more clearly understood by studying an embodiment, which is in no way limiting and illustrated in the appended figures, wherein:

FIG. 2b shows an axial cutaway view along the plane IIb - IIb of FIG. 2a;

FIG. 3b is a perspective view of the mixer assembly of FIG. 3a;

FIG. 4b is a top plan view of the storage vessel of FIG. 4a.

DETAILED DESCRIPTION OF THE INVENTION

Figure 1:
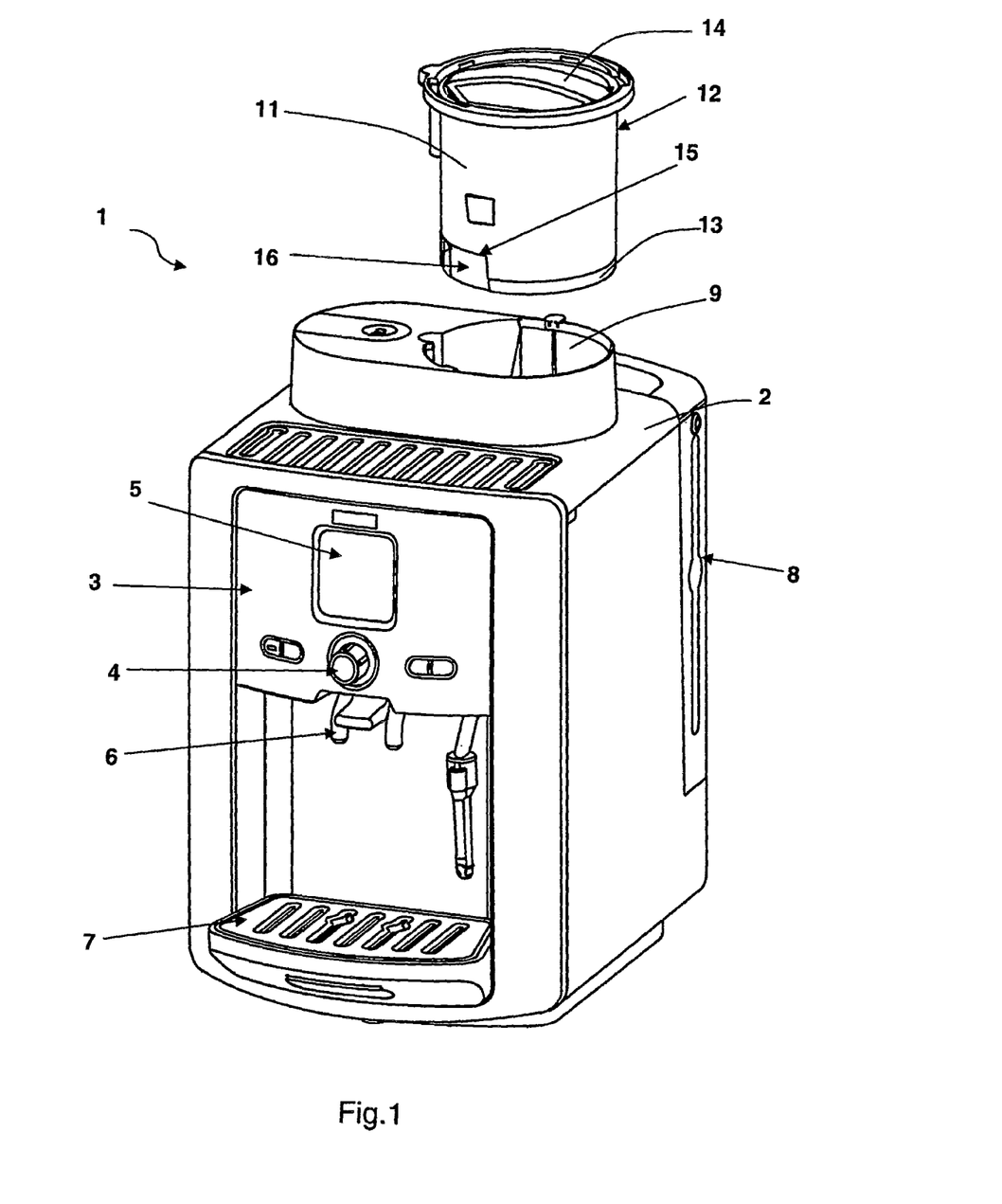
FIG. 1 shows a perspective view of an automatic coffee maker having an automatic ground coffee dispenser of the invention, with the storage vessel of the dispenser illustrated next to the coffee maker.

An automatic coffee maker 1 having a dispenser 10 (FIG. 2b) of the invention is illustrated in FIG. 1, in which can be discerned a housing 2 of the machine having a front panel 3 equipped with control switches 4 and a display 5 for showing information related to the operation of the machine intended for the users. The beverage is prepared in the brewing chamber, which receives an amount of ground coffee from the dispenser 10 and pressurized hot water from a boiler supplied from a water storage vessel 8. The beverage thus obtained flows via two nozzles 6, which dispense the coffee into a cup placed on a cup holder tray 7. The coffee maker in addition has a bin for recovering cakes of used grounds ejected from the brewing chamber (not visible in the drawings).

Such an automatic coffee maker comprises prior art elements encountered in this category of machines and may incorporate the characteristics described in document WO 9912457 concerning the device for adding ground coffee to the brewing chamber and for ejecting the cakes of used grounds. Such a machine is particularly suitable for ensuring the adequate temperature of the water fed into the brewing chamber, and it is capable of compacting the ground coffee in the brewing chamber.

The coffee obtained after the brewing of the ground coffee in the chamber is emptied from the machine into a collecting container such as the one described in document WO 9912456.

Such a machine is capable of dispensing numerous cups of coffee during several preparation cycles without the user having to intervene to add more coffee or water, or to remove the used grounds after each brewing.

The top portion of the housing 2 of the coffee maker receives an automatic ground coffee dispenser 10 having, in a receptacle 9, a removable storage vessel 11 containing an amount of ground coffee. The storage vessel 11 has an overall cylindrical shape, a side wall 12, a bottom 13, and a lid 14. The storage vessel has an outflow opening 15 formed in its bottom portion, more particularly in the illustrated example said outflow opening has the shape of an oblong slot partially formed in the side wall 12 and extending into the wall of the bottom 13. A movable shutter 16 having the same shape as the outflow opening 15 makes it possible to close this opening when the storage vessel is removed from the machine and to open this opening when the storage vessel is installed in the machine. The ground coffee exiting via the outflow opening 15 passes into a transfer chute and then falls by gravity into the brewing chamber of the machine.

Figure 2A:
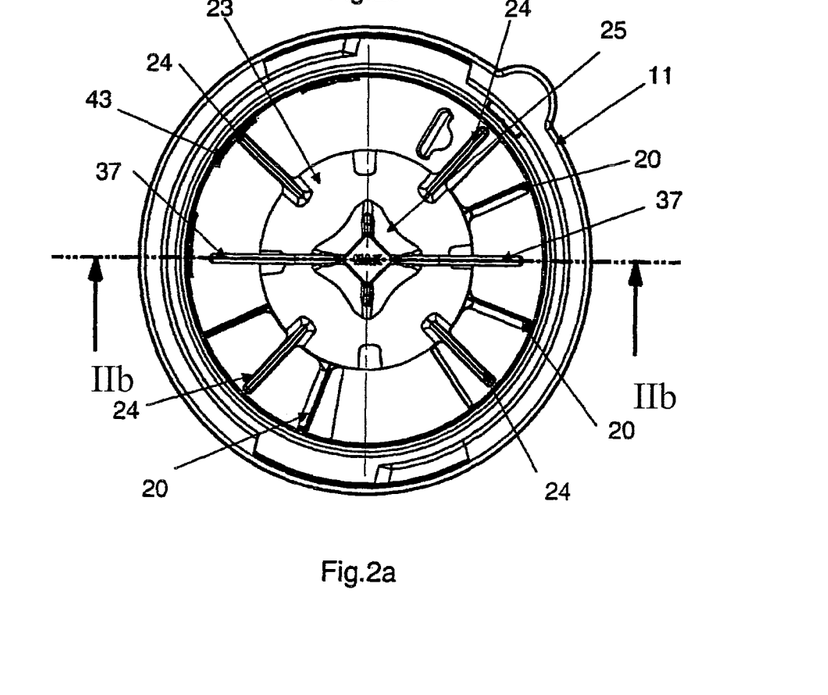
FIG. 2a shows a top plan view of the dispenser of the invention of FIG. 1, with the lid of its storage vessel removed.
Figure 2B:
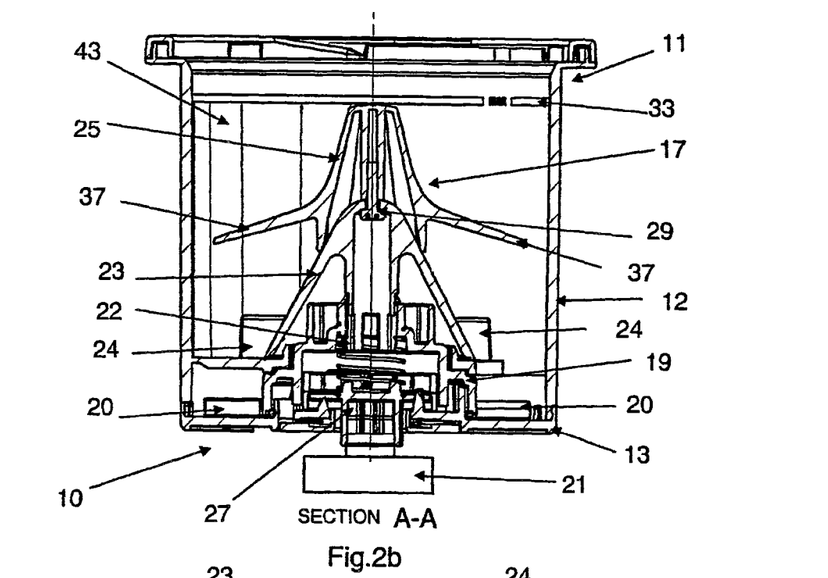

The dispenser 10 is more readily visible in FIGS. 2a and 2b, in which it is possible to discern, inside its storage vessel 11, a cone-shaped driver 23 equipped with a plurality of drive paddles 24 (provision is made of four equidistantly-spaced drive paddles in the example shown) fastened to a cylindrical hub 19 similarly comprising a plurality of serving paddles 20 (provision is made of eight serving paddles in the example shown). In its bottom portion, the cone-shaped driver 23 has hooked tabs 22 fastening inside the cylindrical hub 19, which is in turn driven in rotation about the vertical axis of the storage vessel 11 by motor means 21. The motor means 21 comprise a motor, a reducer, a control circuit and a power supply circuit (not shown). Because the storage vessel is removably installed relative to the other installed dispenser components, which are fastened to the inside of the housing 2 of the coffee maker, the cylindrical hub 19 is equipped with rotary coupling means 27 cooperating with corresponding coupling means of the motor means 21.

In operation, the drive paddles 24 turn and direct the ground coffee to the serving paddles 20 below, which turn in order to convey a serving of ground coffee to the outflow opening. After dispensing a predetermined serving of ground coffee, the stopping of the motor means 21 ensures a positioning of the serving paddles 20 in such a manner that two of them border the outflow opening 15 in such a manner that any flow of ground coffee is halted. The operating principle of such a ground coffee dispenser is described in more detail in document EP 0 735 836.

According to the invention, the internal wall of the storage vessel 11 comprises at least one longitudinal rib 43 projecting into the storage vessel 11. In the example illustrated in the figures, three longitudinal ribs 43 are formed on the inner surface of the side wall 12 of the storage vessel 11. As can be more readily discerned in FIGS. 4a and 4b, three ribs 43 are uniformly distributed in a circular segment forming a 90° angle to the top and radially protrude toward the center of the storage vessel 11.

Figure 4A:
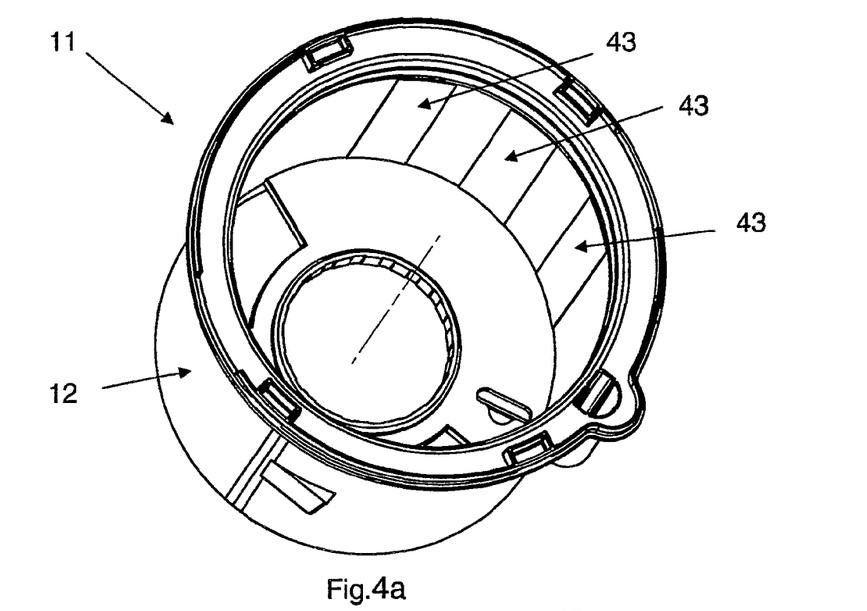
FIG. 4a is a perspective view of a storage vessel of the dispenser of the invention without the lid.
Figure 4B:
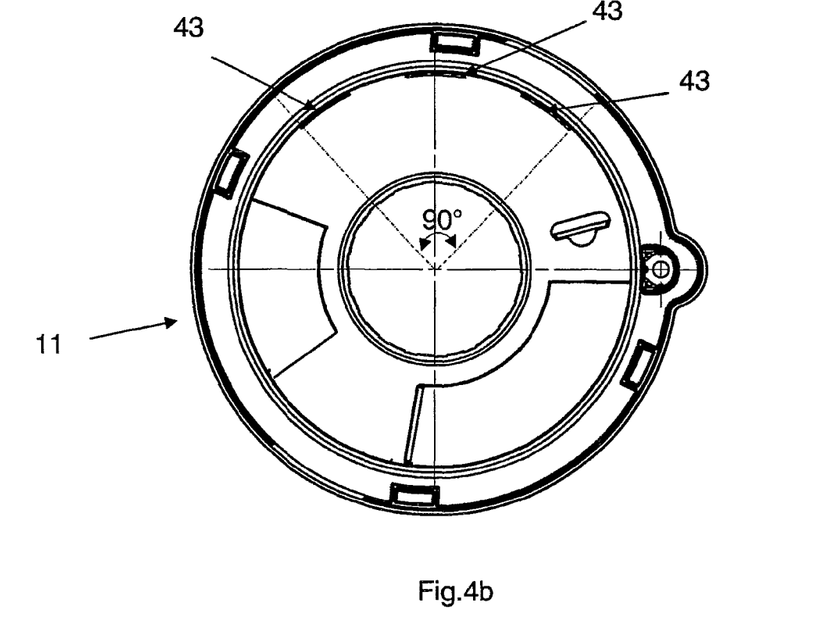

Each rib 43 has a shape of a circular ring segment, a uniform thickness of 0.2 mm, a width of ca. 10 mm, and extends along the entire effective length of the storage vessel, notably to the maximum filling level of the storage vessel 11. Such a uniform thickness enables the individual particles to slide easily on the circular arc portion of each rib and also facilitates the cleaning of the storage vessel. The ribs 43 are integrally formed with the storage vessel 11, preferably in a plastic material by an injection technique.

According to another advantageous characteristic of the invention, the cone-shaped driver 23 extends to the top portion of the storage vessel 11 and forms a pyramid-shaped mixer 25, with the apex of the pyramid pointing toward the lid 14 of the storage vessel. The mixer 25 is fastened to the cone-shaped driver 23 by a central screw 29 and with the latter element forms a monobloc mixer assembly 17. This mixer assembly 17 is thus brought into rotation about the vertical axis of the storage vessel when the motor means 21 is supplied with power.

Figure 3A:
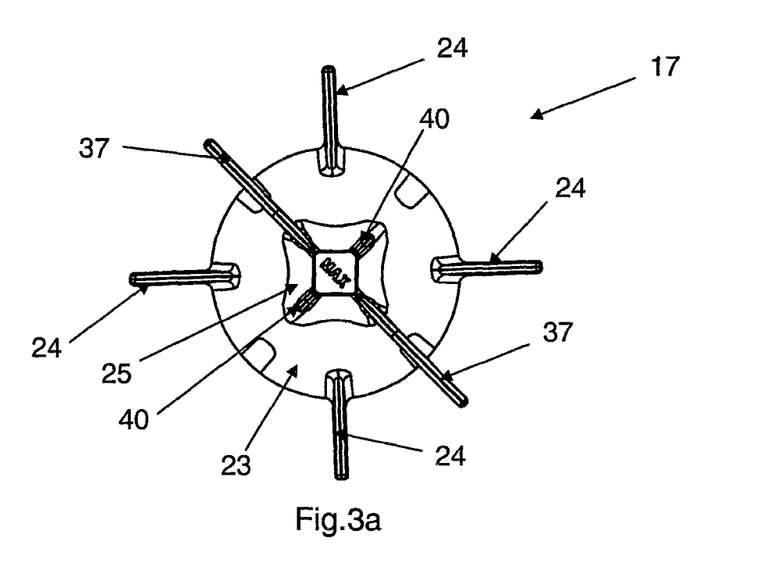
FIG. 3a is a view from above of a mixer assembly associated with the dispenser of the invention.
Figure 3B:
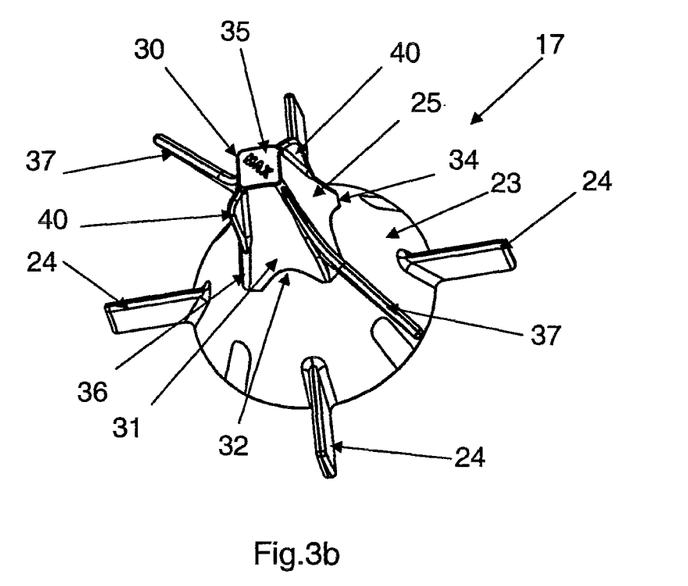

A monobloc mixer assembly 17 is more readily visible in FIGS. 3a and 3b, in which can be discerned the mixer 25 having a central body 30 in the shape of a pyramid trunk of which the square base 34 rests on the apex of the cone-shaped driver 23. For achieving a better contact with the top of the cone-shaped driver 23, provision is made of indentations 32 in the form of circular arcs at the base of each side 31 of the body 30. The height of the body 30 is such that the mixing assembly 17 reaches the maximum filling level 33 (FIG. 2b) of the storage vessel 11. To make this filling level easier to see, the apex 35 of the body 30 bears the inscription "MAX".

According to another advantageous characteristic of the invention, the body 30 bears two long fins 37 each disposed in the prolongation of the other along one of the diagonals of the base 34, each fin radially extending from a ridge 36 of the body 30 to the inner periphery of the storage vessel 11 and forming a clearance therewith. The fin 37 radially extends slightly toward the bottom of the storage vessel (forming an angle of ca. 20° relative to the horizontal), and has the shape of a rod with a small cross-sectional dimensions, for example a square cross-section with sides less than or equal to 4 mm. Its function is to break the lumps of ground coffee formed in the top portion of the storage vessel, more precisely in the vicinity of the periphery thereof. For a more efficient mixing, the axis of a fin 37 is angularly offset, at a 45° angle relative to the angle of a paddle 24.

In its top portion, the body 30 also has two short fins 40 each disposed in the prolongation of the other in a vertical plane passing through the other diagonal of the base 34. A short fin 40 has a generally triangular shape, the base of the triangle being located at the level of the apex 35. The two short fins 40 form a means for grasping the mixer assembly in a manner analogous to the fins of a wing nut, by which the user applies the rotation torque when he or she turns the mixer assembly manually to clean the bottom of the storage vessel 11.

For operation, the user fills the storage vessel by adding coffee up to the "MAX" level of the apex 35. The storage vessel 11 is then installed in the coffee maker. When the user orders [makes] a cup of coffee, the motor means 21 turn the cylindrical hub 19 and the mixer assembly 17. This brings about a mixing of the ground coffee in the top portion of the storage vessel with the aid of the pyramid-shaped mixer 25. Bridges or lumps of ground coffee, as well as any vaults of ground coffee are broken when they come into contact with the ribs 43 while being conveyed by the paddles 24 and by the long fins 37.

The thus homogenized and fluidified ground coffee descends to the serving paddles 20, which dispense the necessary serving via the outflow opening 15.

Hence several cups of coffee can be prepared without the user having to intervene. When the storage vessel 11 is empty, it is removed from the machine and the user can clean out the coffee residue (manually with a brush, for example) and then turn the mixer assembly 17 manually by applying a rotary movement to the short fins 40. The storage vessel can then be filled with ground coffee.

Obviously the invention is in no way limited to the embodiment described and illustrated herein, which was merely provided as an example.

Hence the ribs 43 can have a triangular cross-section, the triangle being oriented in such a manner that the base initially encounters the drive paddles and the apex is aligned according to the direction of rotation.

Hence the long 37 and short 40 fins do not have to be flat, but can be spiral-shaped and oriented in either the clockwise or counterclockwise direction. The radial long fins can end in a descending portion running along the inside cylindrical wall of the storage vessel 11.

This mixing system can be used with other powder products such as powdered milk, sugar, etc.

Modifications are possible, particularly in terms of the constitution of the various elements or by substituting equivalent techniques, without in any way exceeding the scope of protection of the invention.

The invention claimed is:

1. An automatic ground coffee dispenser having a ground coffee storage vessel comprising rotary serving paddles for transferring a predetermined amount of ground coffee through an outflow opening formed in a bottom of the storage vessel and a cone-shaped driver with rotary paddles disposed above the outflow opening and brought into rotation about a vertical axis of the storage vessel by motor means, wherein an internal wall of the storage vessel comprises at least one longitudinal rib projecting into the storage vessel.

2. The dispenser as in claim 1, wherein a width of the longitudinal rib covers a circular segment with an angle less than or equal to an angle between two adjacent rotary paddles.

3. The dispenser as in claim 1, containing three longitudinal ribs uniformly distributed on a circular segment with an angle less than or equal to an angle between two adjacent rotary paddles.

4. The dispenser as in claim 1, wherein the longitudinal rib is a circular ring segment with a thickness in the range of between 0.1 and 0.5 mm.

5. The dispenser as in claim 1, wherein the longitudinal rib extends substantially along an effective height of the storage vessel.

6. The dispenser as in claim 1, wherein the cone-shaped driver extends into a top portion of the storage vessel in the form of a pyramid-shaped mixer.

7. The dispenser as in claim 6, wherein the cone-shaped driver and the mixer form a monobloc mixer assembly extending up to a maximum fill level of the storage vessel.

8. The dispenser as in claim 6, wherein the storage vessel has a circular cross-section and the mixer has a square cross-section.

9. The dispenser as in claim 6, wherein the pyramid-shaped mixer has a height equal to at least half of the height of the mixer assembly.

10. The dispenser as in claim 6, wherein the pyramid-shaped mixer comprises two radially extending long fins arranged in proximity to a bottom end of said pyramid-shaped mixer.

11. The dispenser as in claim 10, wherein said long fins are angularly offset relative to the paddles of the cone-shaped driver.

12. The dispenser as in claim 10, wherein the pyramid-shaped mixer has two radially extending short fins arranged in proximity to a top end of said pyramid-shaped mixer.

13. The dispenser as in claim 12, wherein the long fins are arranged in a first vertical plane passing through a diagonal of a cross-section of the mixer and further in wherein the short fins are arranged in a second vertical plane perpendicular to the first vertical plane.

14. The dispenser as in claim 6, wherein the pyramid-shaped mixer has an apex with a flat top surface that bears an indicator of the filling level of the storage vessel.

15. The dispenser as in claim 1, wherein the storage vessel is removably installed in a receptacle of the dispenser and has means for coupling in rotation with corresponding means of the motor means of the dispenser.

16. An automatic coffee maker, having a dispenser as in claim 1.

17. The dispenser as in claim 1, wherein the longitudinal rib is a circular ring segment with a thickness substantially equal to 0.2 mm.

* * * * *

UNITED STATES PATENT AND TRADEMARK OFFICE
CERTIFICATE OF CORRECTION

PATENT NO. : 8,439,235 B2  
APPLICATION NO. : 12/992732  
DATED : May 14, 2013  
INVENTOR(S) : Séverine Mih et al.

Page 1 of 1

It is certified that error appears in the above-identified patent and that said Letters Patent is hereby corrected as shown below:

In the Claims:

Column 8, Line 47, Claim 13, after "further" delete "in"

Column 8, Line 57, Claim 16, after "maker" delete ","

Signed and Sealed this
Seventeenth Day of September, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,439,235 B2
APPLICATION NO. : 12/992732
DATED : May 14, 2013
INVENTOR(S) : Mih et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 256 days.

Signed and Sealed this
Eighth Day of September, 2015

Michelle K. Lee
*Director of the United States Patent and Trademark Office*